United States Patent
Hattori

[19]

[11] Patent Number: 5,867,342
[45] Date of Patent: Feb. 2, 1999

[54] TRACKING SERVO SYSTEM FOR MAGNETIC DISC DRIVE WITH REDUCED HEAD-SETTLING TIME

[75] Inventor: Toshiro Hattori, Tokyo, Japan

[73] Assignee: NEC Corporation, Tokyo, Japan

[21] Appl. No.: 662,147

[22] Filed: Jun. 12, 1996

[30] Foreign Application Priority Data

Jun. 12, 1995 [JP] Japan .................................. 7-144441

[51] Int. Cl.⁶ ....................................................... G11B 5/09
[52] U.S. Cl. ..................................... 360/77.08; 360/77.04; 360/78.09
[58] Field of Search .............................. 360/77.08, 77.04, 360/78.09, 77.02, 78.04, 78.06; 369/32, 44.27, 44.28, 44.29

[56] References Cited

U.S. PATENT DOCUMENTS 5,404,252   4/1995   Nagasawa et al. .................. 360/75.09

OTHER PUBLICATIONS

Sacks et al., "Advanced Methods for Repeatable Runout Compensation", IEEE Transactions on Magnetics, vol. 31, No. 2, (1995), pp. 1031–1036.

*Primary Examiner*—Nabil Hindi
*Attorney, Agent, or Firm*—Foley & Lardner

[57] ABSTRACT

A state variable estimator is operative, in a change-over of a magnetic head, to determine a predicted value of a state variable of a frequency-shaped filter in a follow-up to a track after the change-over based on a current head position of thereof before the change-over, by using a set of calculated coefficients representative of an amplitude and a phase difference relative to the current head position of a sine wave to be calculated by a discrete Fourrier series, as the sine wave represents the state variable of the frequency-shaped filter when the track is followed up, so that a state variable re-setting of control system is achieved to minimize a square error integration of the predicted value and a state variable of a phase compensating filter, as the change-over is a step response of a closed loop control system.

4 Claims, 6 Drawing Sheets

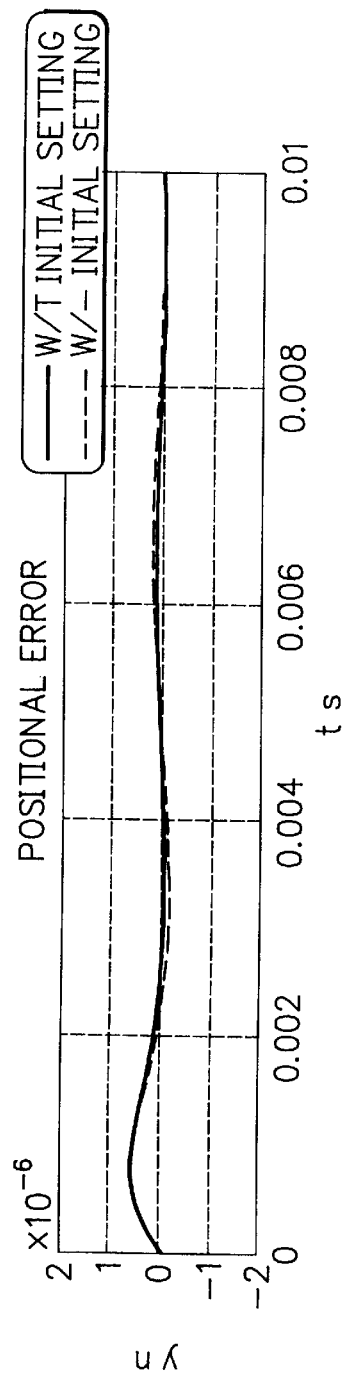
F I G. 2A
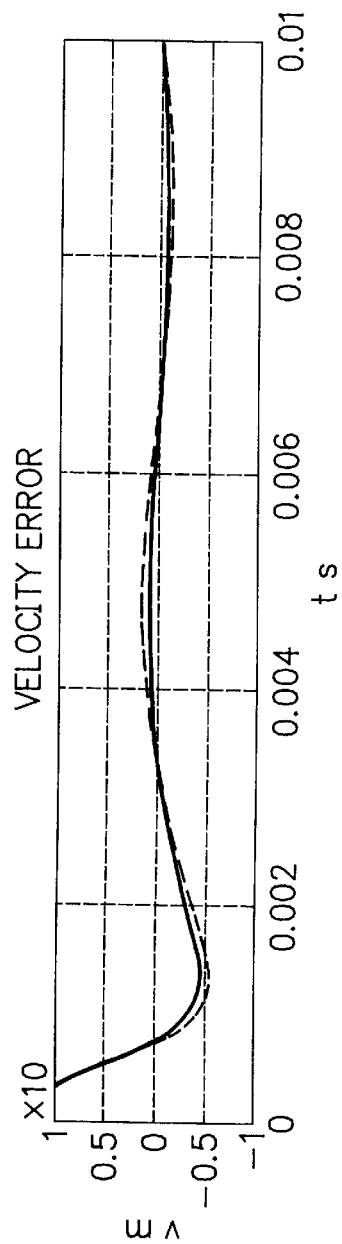
F I G. 2B

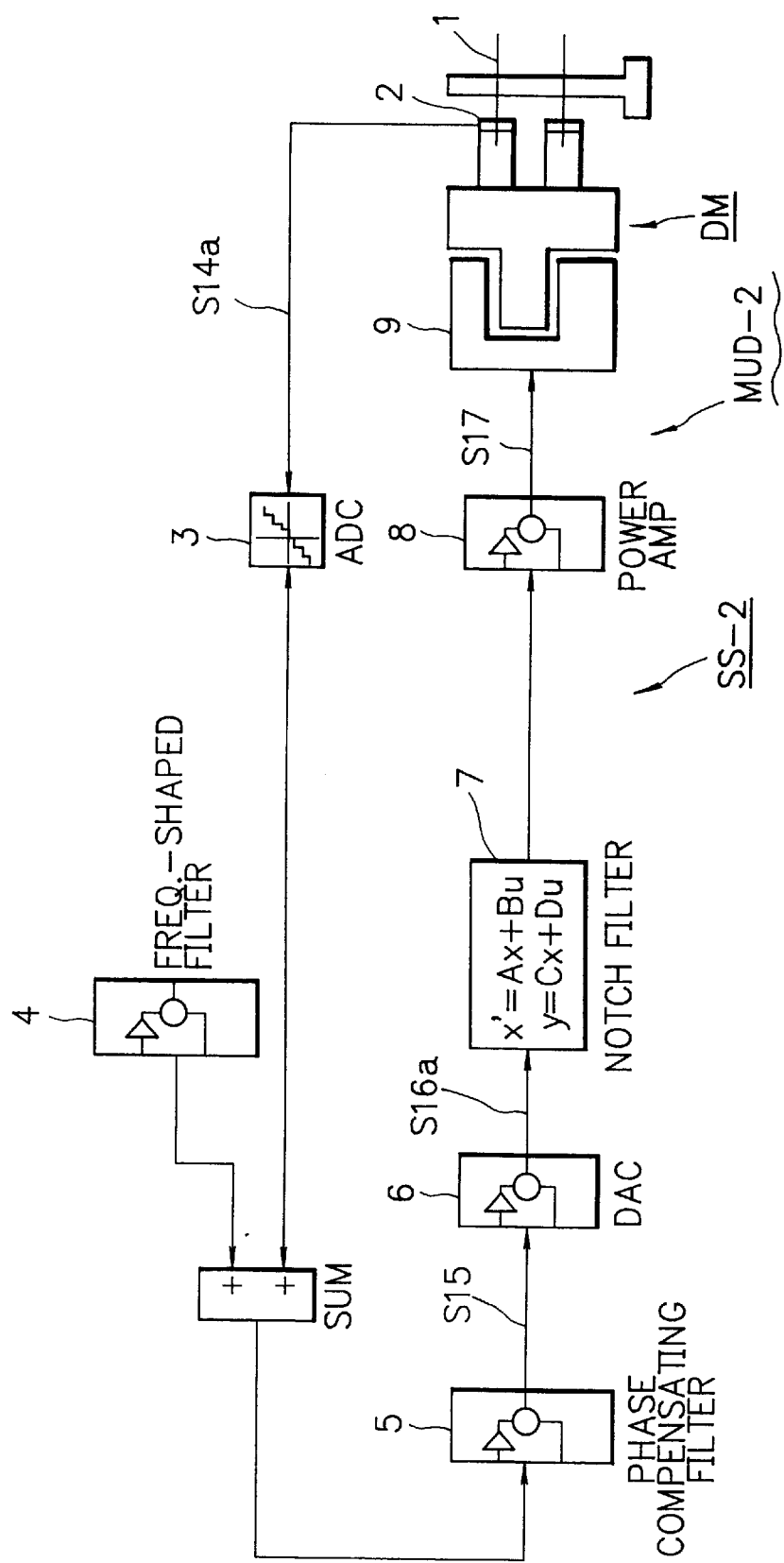

TRACKING SERVO SYSTEM FOR MAGNETIC DISC DRIVE WITH REDUCED HEAD-SETTLING TIME

BACKGROUND OF THE INVENTION

The present invention generally relates to a tracking servo system for a magnetic disc drive, and particularly, to an improvement of a tracking servo system for a magnetic disc drive, in which a plurality of magnetic heads are changeable therebetween with a reduced positioning time for a settling to a target track.

DESCRIPTION OF THE RELATED ART

The magnetic disc drive includes a tracking servo system as a head positioning control system using a phase compensating filter such as a PID (proportioning-integration-differentiation) compensator or a lead-lag filter for having a magnetic head positioned to follow up a track on a magnetic disc.

In a typical conventional magnetic disc drive, the servo system has employed a closed loop using a phase compensating filter, providing a sufficient control range to secure a compression ratio for low-degree rotation harmonic components of runout in dependence on a required accuracy for a head positioning.

It however has become difficult to secure the compression ratio for low-degree rotation harmonic components of runout, due to a narrowed traffic pitch, an extended sampling time of a position error signal, etc.

To this point, there has been reported a conventional improvement in a paper "Advanced Methods for Repeatable Runout Compensation": IEEE Transactions on Magnetics Vol. 31, No. 2, March 1995, in which a so-called internal principle is applied as a rotation harmonic runout compression filter so that a closed loop contains a sine wave model, raising a gain of rotation harmonic components, thereby improving a loop characteristic as a compression characteristic of frequency of the rotation harmonic components.

In a magnetic disc drive adaptive for driving a plurality of magnetic discs, there has been employed an actuator with a plurality of rotation heads changeable therebetween to continuously read stored data on an identical cylinder, permitting a high-speed reading with a reduced number of mechanical actions.

In use of a frequency characteristic curve shaped filter (hereafter "frequency-shaped filter"), a particular frequency associated with a required compression has a closed loop attenuation pole caused thereon, resulting in an undesirable transient characteristic.

In the case of changing over rotation heads, if an off-track therebetween is large, then it is disabled to make a recording or reproduction of data promptly after the changeover, as a time is necessary for settling a selected head within a range in which the head can work to read and write data to and from a target track. The magnetic disc drive could have exhibited a desirable performance if the head settling time were reduced.

The present invention has been achieved with such points in mind.

SUMMARY OF THE INVENTION

It therefore is an object of the present invention to provide a tracking servo system for a magnetic disc drive permitting a motion head to be settled within a reduced time after change-over.

To achieve the object, a genus of the present invention provides a tracking servo system for a magnetic disc drive for driving a plurality of magnetic disc media of which a respective one has on a tracking side thereof a plurality of split data field type concentric tracks of which a respective one has a plurality of servo fields of which a respective one has written therein servo information and of which a particular one has an index data as the servo information thereof at a radial direction of the plurality of magnetic disc media, the magnetic disc drive including a rotary actuator, and a plurality of magnetic heads integrally rotatable therewith so that an arbitrary magnetic head is alternatively selected to effect one of a data writing and a data reproduction to and from the respective track on the tracking side of a corresponding one of the plurality of magnetic disc media, the tracking servo system including a positioning control means composed of a phase compensating filter for securing a stable positioning of the arbitrary magnetic head, and a frequency-shaped filter having therein a sine wave generating model, for compressing a positional error of a rotation harmonic component, and a head velocity estimator means for estimating a velocity of the arbitrary magnetic head, wherein the tracking servo system further comprises a state variable estimator means operative, in a change-over of the arbitrary magnetic head for effecting said one of the data writing and the data reproduction at different tracking sides of the plurality of magnetic disc media, to determine a predicted value of a state variable of the frequency-shaped filter in a follow-up to the respective track after the change-over of the arbitrary magnetic head based on a current head position of the arbitrary magnetic head determined from the index data read from the particular servo field before the change-over, by using a set of calculated coefficients representative of an amplitude and a phase difference relative to the current head position of a sine wave to be calculated by a discrete Fourrier series, as the sine wave represents the state variable of the frequency-shaped filter when the respective track is followed up by the arbitrary magnetic head, and a state variable re-setter means for re-setting the state variable of the frequency-shaped filter and a state variable of the phase compensating filter to minimize a square error integration of the predicted value of the state variable of the frequency-shaped filter and the state variable of the phase compensating filter, as the change-over of the arbitrary magnetic head is a step response of a closed loop control system, so that a settling time of the arbitrary magnetic head due to the change-over thereof is reduced.

Moreover, to achieve the object, another genus of the present invention provides a tracking servo system for a magnetic disc drive for driving a plurality of magnetic disc media of which a respective one has on a tracking side thereof a plurality of split data field type concentric tracks of which a respective one has a plurality of servo fields of which a respective one has written therein servo information and of which a particular one has an index data as the servo information thereof at a radial direction of the plurality of magnetic disc media, the magnetic disc drive including a rotary actuator, and a plurality of magnetic heads integrally rotatable therewith so that an arbitrary magnetic head is alternatively selected to effect one of a data writing and a data reproduction to and from the respective track on the tracking side of a corresponding one of the plurality of magnetic disc media, the tracking servo system including a positioning control means composed of a phase compensating filter for securing a stable positioning of the arbitrary magnetic head, and a frequency-shaped filter having therein a sine wave generating model for compressing a positional error of a rotation harmonic component, and a head velocity estimator means for estimating a velocity of the arbitrary magnetic head, wherein the tracking servo system further comprises a state variable estimator means operative, in a change-over of the arbitrary magnetic head for effecting said one of the data writing and the data reproduction at different tracking sides of the plurality of magnetic disc media, to determine a predicted value of a state variable of the frequency-shaped filter in a follow-up to the respective track after the change-over of the arbitrary magnetic head based on a current head position of the arbitrary magnetic head determined from the index data read from the particular servo field before the change-over, by using a combination of a calculated amplitude and a calculated phase difference of the state variable of the frequency-shaped filter between a pair of said tracking sides of the plurality of magnetic disc media, and a state variable re-setter means for re-setting the state variable of the frequency-shaped filter and a state variable of the phase compensating filter to minimize a square error integration of the predicted value of the state variable of the frequency-shaped filter and the state variable of the phase compensating filter, as the change-over of the arbitrary magnetic head is a step response of a closed loop control system, so that a settling time of the arbitrary magnetic head due to the change-over thereof is reduced.

Further, to achieve the object, another genus of the present invention provides a tracking servo system for a magnetic disc drive for driving a plurality of magnetic disc media of which a respective one has on a tracking side thereof a plurality of split data field type concentric tracks of which a respective one has a plurality of servo fields of which a respective one has written therein servo information and of which a particular one has an index data as the servo information thereof at a radial direction of the plurality of magnetic disc media, the magnetic disc drive including a rotary actuator, and a plurality of magnetic heads integrally rotatable therewith so that an arbitrary magnetic head is alternatively selected to effect one of a data writing and a data reproduction to and from the respective track on the tracking side of a corresponding one of the plurality of magnetic disc media, the tracking servo system including a positioning control means composed of a phase compensating filter for securing a stable positioning of the arbitrary magnetic head, and a frequency-shaped filter having therein a sine wave generating model for compressing a positional error of a rotation harmonic component, and a head velocity estimator means for estimating a velocity of the arbitrary magnetic head, wherein the tracking servo system further comprises a state variable estimator means operative, in a change-over of the arbitrary magnetic head for effecting said one of the data writing and the data reproduction at different tracking sides of the plurality of magnetic disc media, to determine a predicted value of a state variable of the frequency-shaped filter in a follow-up to the respective track after the change-over of the arbitrary magnetic head based on a current head position of the arbitrary magnetic head determined from the index data read from the particular servo field before the change-over, by using a set of calculated coefficients representative of an amplitude and a phase difference relative to the current head position of a sine wave to be calculated by a discrete Fourrier series, as the sine wave represents the state variable of the frequency-shaped filter when the respective track is followed up by the arbitrary magnetic head, and a mode selector means responsive to the change-over of the arbitrary magnetic head for disconnecting a first input to the frequency-shaped filter and adding a feed-forward output of the frequency-shaped filter and a feedback of a second input to the frequency-shaped filter in a follow control mode to input a resultant signal to the positioning control means, and to a lapse of a predetermined sampling time after the change-over of the arbitrary magnetic head for connecting the first input to the frequency-shaped filter and disconnecting the feedback of the second input to the frequency-shaped filter to enter the follow control mode so that a settling time of the arbitrary magnetic head due to the change-over thereof is reduced.

Still more, to achieve the object, another genus of the present invention provides a tracking servo system for a magnetic disc drive for driving a plurality of magnetic disc media of which a respective one has on a tracking side thereof a plurality of split data field type concentric tracks of which a respective one has a plurality of servo fields of which a respective one has written therein servo information and of which a particular one has an index data as the servo information thereof at a radial direction of the plurality of magnetic disc media, the magnetic disc drive including a rotary actuator, and a plurality of magnetic heads integrally rotatable therewith so that an arbitrary magnetic head is alternatively selected to effect one of a data writing and a data reproduction to and from the respective track on the tracking side of a corresponding one of the plurality of magnetic disc media, the tracking servo system including a positioning control means composed of a phase compensating filter for securing a stable positioning of the arbitrary magnetic head, and a frequency-shaped filter having therein a sine wave generating model for compressing a positional error of a rotation harmonic component, and a head velocity estimator means for estimating a velocity of the arbitrary magnetic head, wherein the tracking servo system further comprises a state variable estimator means operative, in a change-over of the arbitrary magnetic head for effecting said one of the data writing and the data reproduction at different tracking sides of the plurality of magnetic disc media, to determine a predicted value of a state variable of the frequency-shaped filter in a follow-up to the respective track after the change-over of the arbitrary magnetic head based on a current head position of the arbitrary magnetic head determined from the index data read from the particular servo field before the change-over, by using a combination of a calculated amplitude and a calculated phase difference of the state variable of the frequency-shaped filter between a pair of said tracking sides of the plurality of magnetic disc media, and a mode selector means responsive to the change-over of the arbitrary magnetic head for disconnecting a first input to the frequency-shaped filter and adding a feed-forward output of the frequency-shaped filter and a feedback of a second input to the frequency-shaped filter in a follow control mode to input a resultant signal to the positioning control means, and to a lapse of a predetermined sampling time after the change-over of the arbitrary magnetic head for connecting the first input to the frequency-shaped filter and disconnecting the feedback of the second input to the frequency-shaped filter to enter the follow control mode so that a settling time of the arbitrary magnetic head due to the change-over thereof is reduced,

BRIEF DESCRIPTION OF THE DRAWINGS

The objects, features and advantages of the present invention will become more apparent from consideration of the following detailed description, in conjunction with the accompanying drawings, in which:

FIG. 2A shows positional error characteristic curves of the tracking servo system of FIG. 1;

FIG. 2B shows velocity error characteristic curves of the tracking servo system of FIG. 1;

FIG. 6 shows in a block diagram the tracking servo system of FIG. 4 in a settling mode.

DESCRIPTION OF THE PREFERRED EMBODIMENTS

Figure 1:
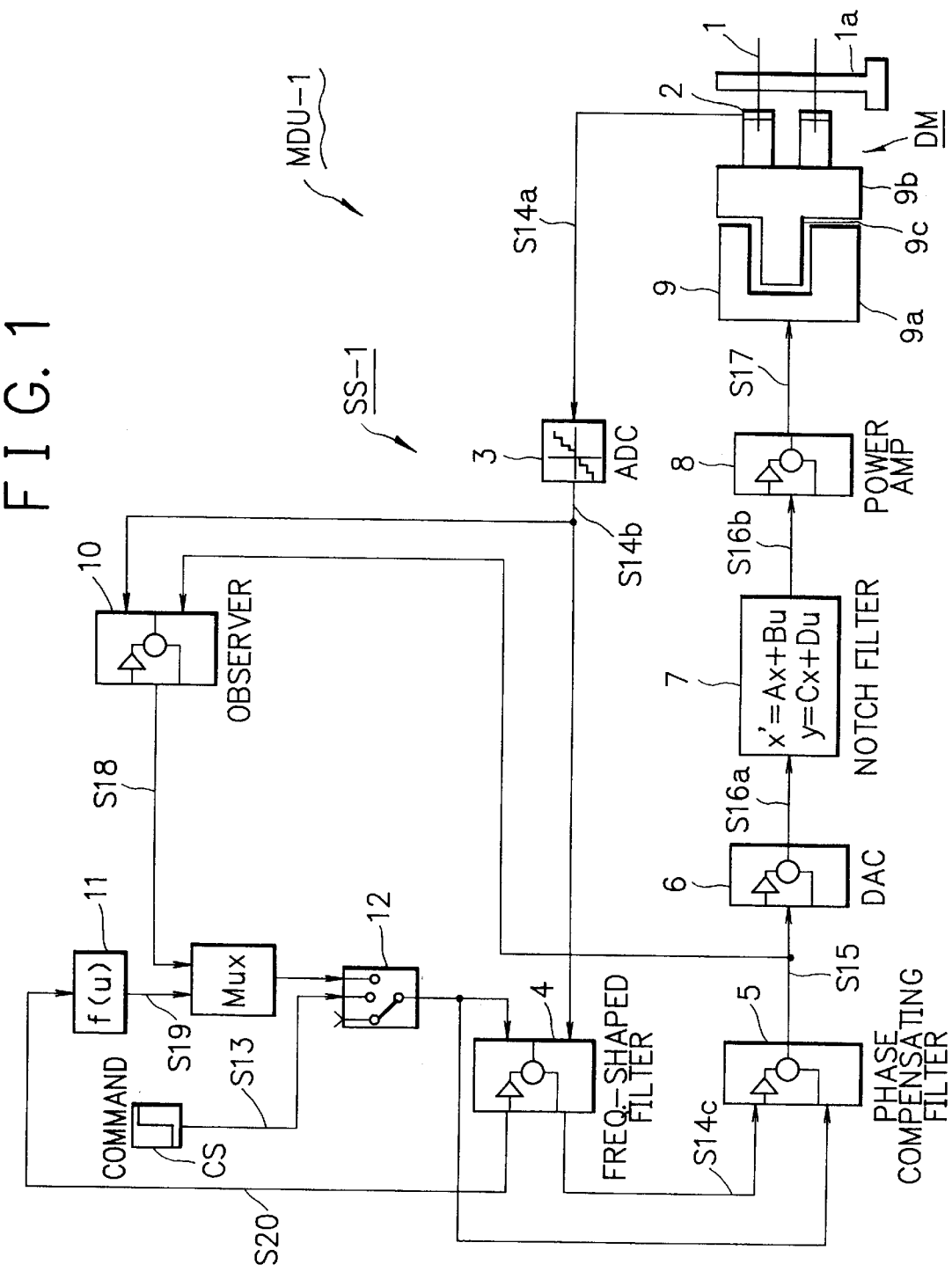
FIG. 1 is a block, diagram of a tracking servo system for a magnetic disc drive according to an embodiment of the invention.

There will be detailed below the preferred embodiments of the present invention, with reference to the accompanying drawings. Like members are designated by like reference characters.

Figure 3:
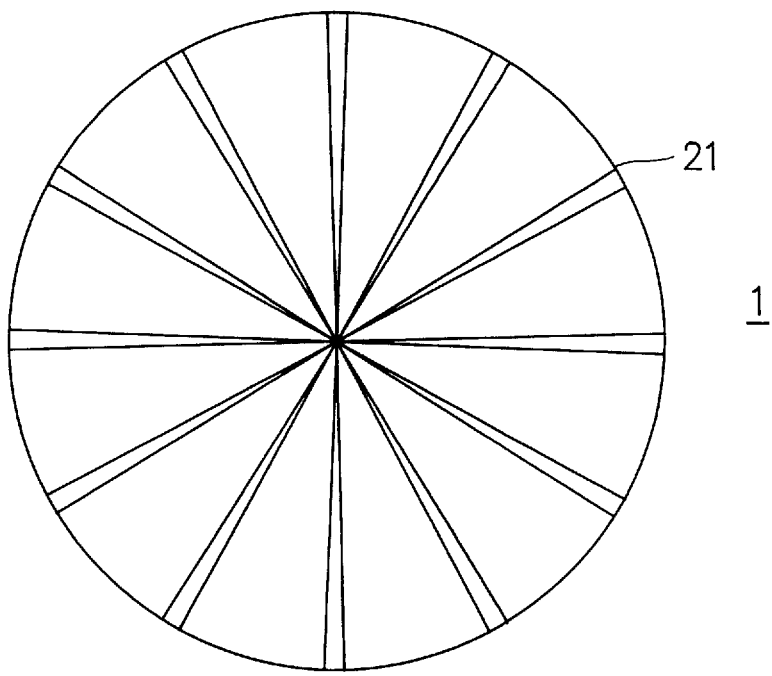
FIG. 3 is a top view of a magnetic disc.

FIG. 1 is a block diagram of a tracking servo system for a magnetic disc drive unit according to an embodiment of the invention, and FIG. 3 is a front view of an arbitrary one of a plurality of magnetic discs 1 installed in the magnetic disc drive of FIG. 1.

In FIG. 1, designated at reference character MDU-1 is the magnetic disc drive unit, and SS-1 is the tracking servo system according to the embodiment.

The magnetic disc drive unit MDU-1 comprises: a drive mechanism MD including, a spindle 1a rotatable about a longitudinal axis thereof, and a rotary actuator 9 composed of a permanent magnet member 9a, a rotary shaft 9b rotatable about a longitudinal axis thereof, a coil member 9c integrally rotatable with the rotary shaft 9b and a plurality of magnetic heads 2 fixed to the shaft 9b; the tracking servo system SS-1; and an unshown data read-write system.

The arbitrary magnetic disc 1 has on each of front and rear tracking sides thereof a plurality of split data field type concentric tracks of which a respective one has a plurality of servo fields 21 of which a respective one has a servo signal written therein in an initialization of the disc 1 and of which a particular one has an index data as the servo signal thereof at a reference radial direction of the magnetic discs 1 which are integrally rotatable with the spindle 1.

The magnetic heads 2 are integrally rotatable with the rotary shaft 9b so that an arbitrary magnetic head 2 is alternatively selected, i.e. changed over, to effect one of a data writing and a data reproduction to and from a corresponding field in a facing track on either tracking side of a corresponding one of the magnetic discs 1.

The tracking servo system SS-1 comprises an analog-to-digital converter (hereafter "ADC") 3 connected at an input terminal thereof to a positional error signal output terminal of the drive mechanism DM, a frequency-shaped filter 4 connected at an input terminal thereof to an output terminal of the ADC 3, a phase compensating filter 5 connected at an input terminal thereof to an output terminal of the filter 4, a digital-to-analog converter (hereafter "DAC") 6 connected at an input terminal thereof to an output terminal of the filter 5, a notch filter 7 connected at an input terminal thereof to an output terminal of the DAC 6, a power amplifier 8 connected at an input terminal thereof to an output terminal of the filter 7 and at an output terminal thereof to the coil member 9c of the actuator 9.

The tracking servo system SS-1 further comprises an observer 10 as a head velocity estimator connected at input terminals thereof to the output terminals of the ADC 3 and the filter 5, respectively, a state variable estimator 11 connected at an input terminal thereof to a state variable informing terminal of the filter 4, a multiplexer MUX connected at input terminals thereof to output terminals of the observer 10 and the estimator 11, respectively, a command source CS such as a register, a memory, a microprocessor or a central processing unit for reading therefrom or generating a state variable re-setting command, a state variable re-setter 12 connected at input terminals thereof to output terminals of the multiplexer MUX and the command source CS, respectively, and at an output terminal thereof to state variable setting terminals of the filters 4 and 5, respectively.

As the selected head 2 reads a current servo signal, the drive mechanism DM outputs a corresponding positional error signal S14a as an analog signal representative of a current position of the magnetic head 2 relative to a reference position of the magnetic discs 1 defined in a polar coordinate system associated with the spindle 1a or the rotary shaft 9b, whichever is advantageous for a design.

The positional error signal S14a is converted by the ADC 3 into a digital positional error signal S14b which is input to the frequency-shaped filter 4, where it has a number of rotation harmonic components thereof gain-increased to output a resultant signal S14c to the phase compensating filter 5, where it is processed for a stable positioning of the magnetic head 2, i.e. to output a digital head position control signal S15 without causing a divergent or oscillatory state of the servo system SS-1.

The above digital servo processing has an effective control range in a frequency region, and is unable to sufficiently eliminate undesirable influences due to signal components at frequencies exceeding the control range, such as by mechanical resonances.

Therefore, the digital control signal S15 is converted by the DAC 6 into an analog control signal S16a as a voltage signal to be input to the notch filter 7, where it has its excessive-frequency components (such as by mechanical resonances) gain-decreased to output a resultant voltage signal S16b to the power amplifier 8, where it is converted into a drive current S17 for the actuator 9, which is conducted to the coil member 9c.

On the other hand, the digital positional error signal S14b and the digital control signal S15 are input to the observer 10, where they are processed to estimate a velocity S18 of the head 2, such as by an integration using an ideal actuator model.

The state variable estimator 11 employs a set of discrete Fourrier transform coefficients having been calculated in a later-described manner, for responding to a current value (or values) S20 of a later-described state variable (or variables) at the frequency-shaped filter 4, for calculating to predict a value (or values) S19 that the state variable(s) will have after a pertinent selection or change-over of magnetic head 2.

The estimated velocity S18 and the predicted value S19 of state variable are multiplexed by the multiplexer MUX to output a corresponding multiplexed signal to the state variable re-setter 12.

When one head is changed over to another, i.e. when the selected head 2 is changed from that to this, the command source CS outputs a state variable re-setting command S13 to the state variable re-setter 12, which responds thereto for processing the multiplexed signal from the multiplexer MUX to calculate a value the state variable should be re-set to at the frequency-shaped filter 4 and the phase compensating filter 5, which value is informed to the filters 4 and 5, where the state variable is set accordingly.

There will be described below the calculation at the state variable estimator 11 for the frequency-shaped filter 4, of which a state can be expressed such that:

$$X[k+1] = \begin{bmatrix} \cos(\omega T) & -\sin(\omega T) \\ \sin(\omega T) & \cos(\omega T) \end{bmatrix} X[k] + \begin{bmatrix} b_1 \\ b_2 \end{bmatrix} r[k]$$

$$y[k] = [c_1 \; c_2] X[k] + r[k]$$

where $\omega$ is a rotation harmonic frequency, T is a sampling time, r[k] is the positional error as an input to the filter 4, and k is a sample number of the index data.

If the head 2 is settled to a target position, then $r[k] \approx 0$, for which state variables have values such that:

$$\begin{cases} x_{11}[k] = C_1 \cos(k\omega T + \phi_1) \\ x_{12}[k] = C_1 \sin(k\omega T + \phi_1) \end{cases}$$

When this state is changed by selecting a subsequent head, the state variables become such that:

$$\begin{cases} x_{21}[k] = C_2 \cos(k\omega T + \phi_2) \\ x_{22}[k] = C_2 \sin(k\omega T + \phi_2) \end{cases}$$

where, $$\Sigma \equiv \sum_{k=1}^{\frac{2\pi}{\omega T}}$$

and $$\begin{cases} a_1 = \Sigma x[k]\cos(\omega kT) \\ b_1 = \Sigma x[k]\sin(\omega kT) \end{cases}$$

By measuring this state in advance for each tracking side of each disc 2, it is enabled for a calculation to predict a value of state valriable from a combination of the servo signal from a tracking side after a head change-over and the sample number of the index data, such that:

$$x[k] = a_1 \cos(\omega kt) + b_1 \sin(\omega kt).$$

Such the value of state variable of the frequency-shaped filter 4 may be predicted from relationships such that:

$$\Sigma x_{11}^2 = \frac{C_1^2 \pi}{\omega T} + C_1^2 \Sigma \cos 2(k\omega T + \phi_1)$$

$$\Sigma x_{12}^2 = \frac{C_1^2 \pi}{\omega T} + C_1^2 \Sigma \cos 2(k\omega T + \phi_1)$$

$$\Sigma x_{11} x_{21} = \frac{C_1 C_2 \pi}{\omega T} \cos(\phi_2 + \phi_1) +$$

$$C_1 C_2 \cos(\phi_2 - \phi_1) \Sigma \cos 2(k\omega T + \phi_1) - C_1 C_2 \sin(\phi_2 - \phi_1) \Sigma \sin 2(k\omega T + \phi_1)$$

$$\Sigma x_{11} x_{22} = \frac{C_1 C_2 \pi}{\omega T} \sin(\phi_2 + \phi_1) +$$

$$C_1 C_2 \cos(\phi_2 - \phi_1) \Sigma \sin 2(k\omega T + \phi_1) + C_1 C_2 \sin(\phi_2 - \phi_1) \Sigma \cos 2(k\omega T + \phi_1)$$

$$\Sigma x_{12} x_{21} = -\frac{C_1 C_2 \pi}{\omega T} \sin(\phi_2 - \phi_1) +$$

-continued
$$C_1 C_2 \cos(\phi_2 - \phi_1) \Sigma \sin 2(k\omega T + \phi_1) + C_1 C_2 \sin(\phi_2 - \phi_1) \Sigma \cos 2(k\omega T + \phi_1)$$

$$\Sigma x_{12} x_{22} = \frac{C_1 C_2 \pi}{\omega T} \cos(\phi_2 - \phi_1) -$$

$$C_1 C_2 \cos(\phi_2 - \phi_1) \Sigma \cos 2(k\omega T + \phi_1) + C_1 C_2 \sin(\phi_2 - \phi_1) \Sigma \sin 2(k\omega T + \phi_1)$$

which can be reduced such that:

$$a_1 = \frac{\Sigma x_{11} x_{21} + \Sigma x_{12} x_{22}}{\Sigma x_{11}^2 + \Sigma x_{12}^2}$$

$$a_2 = \frac{\Sigma x_{11} x_{22} - \Sigma x_{12} x_{21}}{\Sigma x_{11}^2 + \Sigma x_{12}^2}$$

$$a_1 = \frac{\Sigma x_{11} x_{21}}{\Sigma x_{11}^2}$$

$$a_2 = \frac{\Sigma x_{11} x_{22}}{\Sigma x_{11}^2}$$

and in particular, when $2n\omega T = \pi$ for $n \in N$, a calculation in advance permits a value of a state variable of the frequency-shaped filter to be effectively determined after a head change-over, such that:

$$\begin{cases} x_{21}[k] = a_1 x_{11}[k] - a_2 x_{12}[k] \\ x_{22}[k] = a_2 x_{11}[k] + a_1 x_{12}[k] \end{cases}$$

which means the state variable of the frequency-shaped filter is employed as a sine wave for determining coefficients of a Fourrier series to thereby determine an amplitude ratio and a phase difference between time points before and after a head change-over.

There will be described below the calculation for determining a re-settable value of the state variable at the frequency-shaped filter 4 and the phase compensating filter 5.

A closed loop equation for a servo controller including a VCM (status $X_p$), a phase compensating filter (status $X_c$) and a frequency-shaped filter (status $X_f$) can be expressed such that:

$$x[k+1] = A \cdot X[k] + B \cdot r_{r0}[k]$$

where $X = [X_p^t \; X_c^t \; X_f^t]^t$, and $r_{r0}$ is a runout.

The status equation of the frequency-shaped filter 4 is a non-attenuating periodical function that can be multiplied by an attenuating factor of which a time constant is as large as neglectable in comparison with a settling time of a positional error, such that:

$$e^{-\omega_1 T}$$

to allow a progressive stabilization, thereby achieving a status equation of a target value such that:

$$X_t[k+1] = e^{-\omega_1 T} A_f X_t[k] + B_f r[k]$$

$$= A_t X_t[k] + B_t r[k]$$

For a starting with a target state, an evaluation function is set with a purpose of settling a state variable of the frequency-shaped filter 4 at a high speed, such that:

$$J = \sum_{k=0}^{\infty} (X_t[k]^t - X_f[k]^t)^t Q(X_t[k] - X_f[k])$$

An extended system including a target starting model can be expressed by a status equation such that:

$$\begin{bmatrix} X[k+1] \\ X_r[k+1] \end{bmatrix} = \begin{bmatrix} A & 0 \\ 0 & A_r \end{bmatrix} \begin{bmatrix} X[k] \\ X_r[k] \end{bmatrix} + \begin{bmatrix} B & 0 \\ 0 & B_r \end{bmatrix} \begin{bmatrix} r_{ro} \\ r \end{bmatrix}$$

$$= A_{ext1}X_{ext} + B_{ext1}R_{ext1}$$

$$\begin{bmatrix} X_f[k] \\ X_r[k] \end{bmatrix} = \begin{bmatrix} C & 0 \\ 0 & C_r \end{bmatrix} \begin{bmatrix} X[k] \\ X_r[k] \end{bmatrix} \equiv C_{ext}X_{ext}[k]$$

and hence, if an input is a mere runout, as $r = r_{ro} - [1\ 0]X_p$, it so follows that:

$$\begin{bmatrix} X[k+1] \\ X_r[k+1] \end{bmatrix} = \begin{bmatrix} A & 0 \\ -B_r[1\ 0\ \ldots\ 0] & A_r \end{bmatrix} \begin{bmatrix} X[k] \\ X_r[k] \end{bmatrix} + \begin{bmatrix} B \\ B_r \end{bmatrix} r_{ro}[k]$$

$$= A_{ext2}X_{ext}[k] + B_{ext2}r_{ro}[k]$$

or, if the input is a mere positional error, as $r_0 = r - [1\ 0]X_p$, it so follows that:

$$\begin{bmatrix} X[k+1] \\ X_r[k+1] \end{bmatrix} = \begin{bmatrix} A - B[1\ 0\ \ldots\ 0] & 0 \\ 0 & A_r \end{bmatrix} \begin{bmatrix} X[k] \\ X_r[k] \end{bmatrix} + \begin{bmatrix} B \\ B_r \end{bmatrix} r_r[k]$$

$$= A_{ext3}X_{ext}[k] + B_{ext2}r[k]$$

where $C$ and $C_r$ are matrices for determining the frequency-shaped filter's state variable and a target track.

Accordingly, for an evaluation function in which a weighting function is defined such that:

$$Q_{ext} = C_{ext}{}^{t} \cdot c^{t} \cdot Q \cdot c \cdot C_{ext} \text{ for } c \equiv [-1\ 1],$$

there can be solved a discrete time Lyapunov equation such that:

$$A_{ext}PA_{ext} - P = -Q_{ext},$$

to obtain an expression such that:

$$J = \sum_{k=0}^{\infty} (X_r[k]' - X_f[k]')'Q(X_r[k] - X_f[k])$$

$$= \Sigma(cC_{ext}X_{ext}[k])'Q(cC_{ext}X_{ext}[k])$$

$$= \Sigma X_{ext}[k]Q_{ext}X_{ext}[k]$$

$$= \Sigma[-(A_{ext}X_{ext}[k] + B_{ext}R_{ext}[k])'P(A_{ext}X_{ext}[k] + B_{ext}R_{ext}[k]) +$$

$$X_{ext}[k]'PX_{ext}[k] + X_{ext}[k]A_{ext}PB_{ext}R_{ext}[k] +$$

$$R_{ext}[k]'B'_{ext}PA_{ext}X_{ext}[k] + R_{ext}[k]'B'_{ext}PB_{ext}R_{ext}[k]]$$

$$= X_{ext}[0]'PX_{ext}[0] + \sum_{k=0}^{\infty} [X_{ext}[k]A_{ext}PB_{ext}R_{ext}[k] +$$

$$R_{ext}[k]'B'_{ext}PA_{ext}X_{ext}[k] + R_{ext}[k]'B'_{ext}PB_{ext}R_{ext}[k]]$$

where ext←ext2 if an inter-disc off track is larger than the runout, or ext←ext3 if it is smaller than the runout.

Letting E and later be a 0, this expression can be rewritten for a combination of the controller and the state variable of the frequency-shaped filter, such that:

$$J = [X_p{}^{t}[0]X_{cf}^{t}[0]X_r{}^{t}[0]] \begin{bmatrix} p_{11} & p_{12} & p_{13} \\ p_{12}^{t} & p_{22} & p_{23} \\ p_{13}^{t} & p_{23}^{t} & p_{33} \end{bmatrix} \begin{bmatrix} X_p[0] \\ X_{cf}[0] \\ X_r[0] \end{bmatrix}$$

The evaluation function is partially differentiated with respect to $X_{cf}[0]$, to determine an initial value for a minimized evaluation such that:

$$X_{cf}[0] = -P_{22}{}^{-1}(P_{12}{}^{t}X_p[0] + P_{23}X_r[0])$$

Therefore, promptly after a head change-over, the state variable is changed to a re-settable value determined in an on-line manner, permitting head change-over characteristics to be improved as shown in FIGS. 2A and 2B.

In FIGS. 2A and 2B, curves of a positional error and a velocity error of head 2 are compared between cases with and without a state variable re-setting, respectively. Axis of abscissa represents a lapse of time, and axis of ordinate, the positional error in FIG. 2A and the velocity error in FIG. 2B. Solid lines are for the case with the state variable re-setting, and dashed lines, for the case without the state variable re-setting. In each of the FIGS. 2A and 2B, the solid lines represent an increased tendency to converge to a 0 or near.

There will be described below a tracking servo system SS-2 for a compensation of a magnetic disc drive unit MDU-2 according to another embodiment of the invention, with reference to FIGS. 4 to 6.

Figure 4:
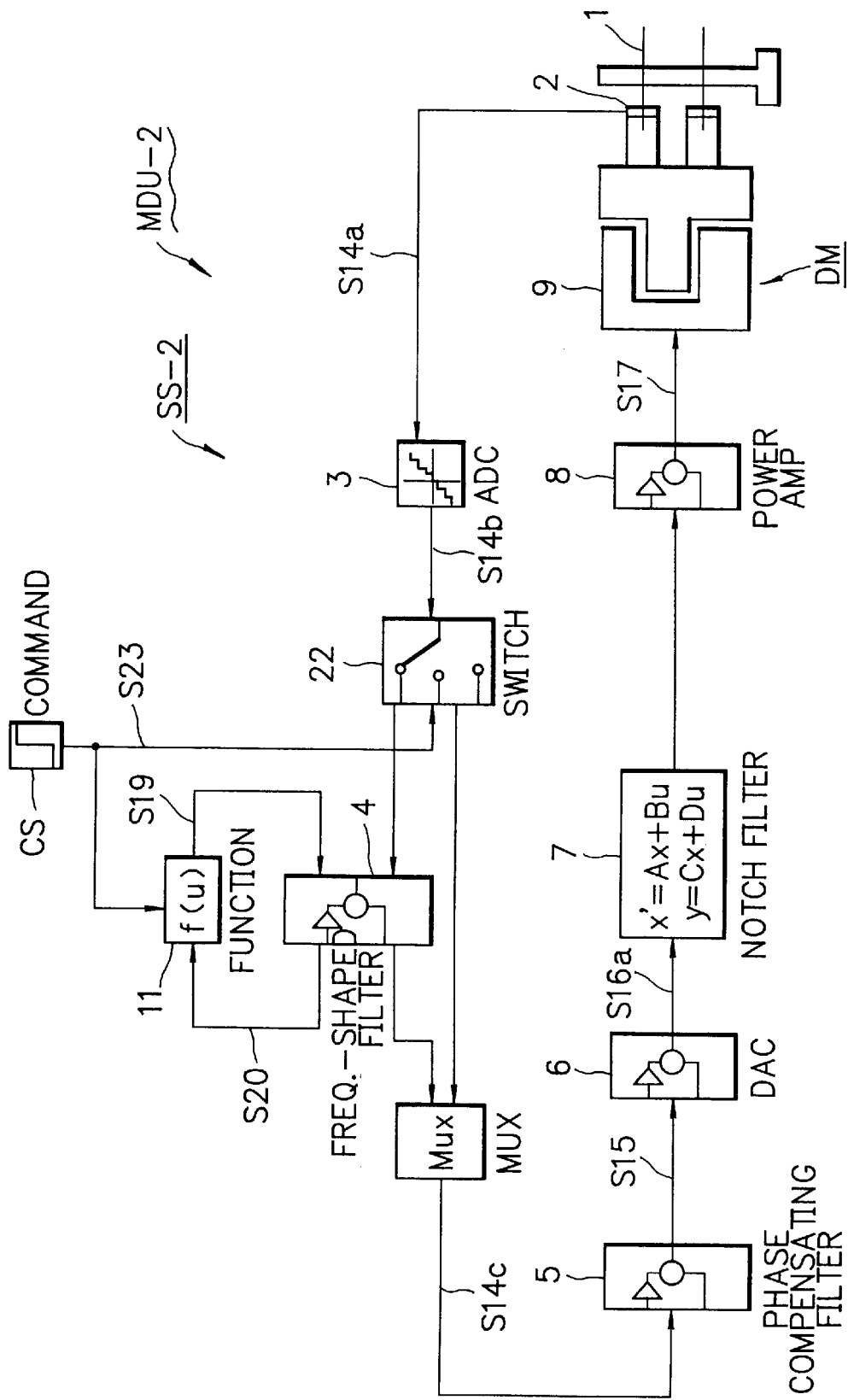
FIG. 4 is a block diagram of a tracking servo system for a magnetic disc drive according to another embodiment of the invention.

FIG. 4 is a block diagram of an entirety of the tracking servo system SS-2, which includes a mode select switch 22 for a selection between a follow mode and a settling mode.

Figure 5:
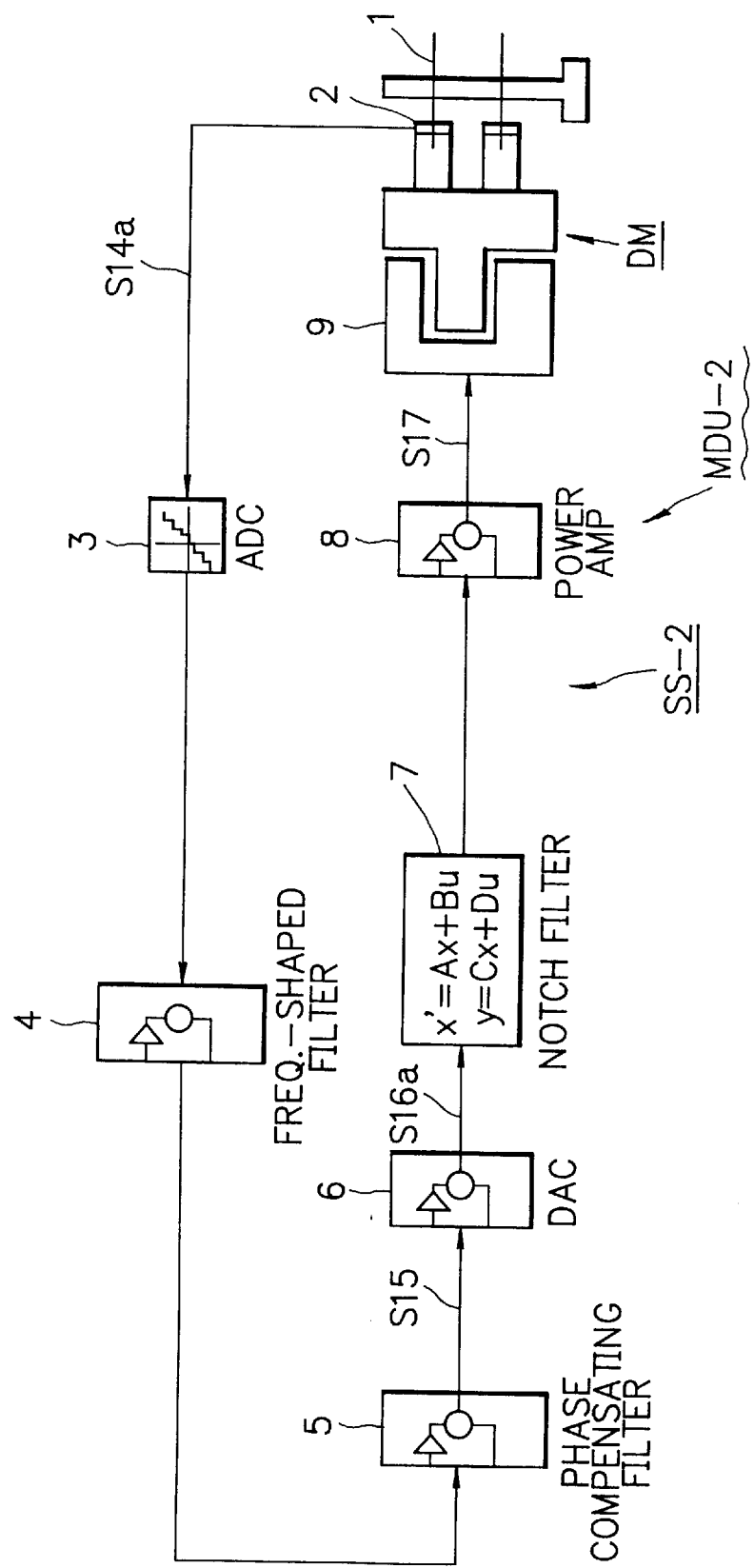
FIG. 5 shows in a block diagram the tracking servo system of FIG. 4 in a follow mode.

FIG. 5 is a block diagram of the servo system SS-2, as it is switched to the follow mode in which a magnetic head 2 follows up a track in an analogous manner to the embodiment SS-1 of FIG. 1.

FIG. 6 is a block diagram of the servo system SS-2, as it is switched to the settling mode.

With a head change-over command given, a mode select command S23 is generated, causing the mode select switch 22 to select the settling mode.

In this mode, a state variable estimator 11 predicts a value S19 of a state variable of a frequency-shaped filter 4 in a described manner, so that the state variable of filter 4 is changed to the predicted value.

Concurrently, as in FIG. 6, an ADC 3 is disconnected from the frequency-shaped filter 4, and connected to a phase compensation filter 5 via an adder SUM, where an output of the frequency-shaped filter 4 is added as a feed-forward signal to an output of the ADC 3. The phase compensating filter 5 and subsequent control members 6–9 serve to drive an actuator 9 in a similar manner to the follow mode.

After several samples are taken, another mode select command S23 is input to the mode select switch 22 to select the follow mode, in which the ADC 3 is connected to the frequency-shaped filter 4 as shown in FIG. 5.

Accordingly, a settling time is effectively reduced in both embodiments.

As will be understood from the foregoing description, according to the present invention, a state variable resetting in a tracking servo system or a feed-forward control by a frequency-shaped filter permits a head change-over on an identical cylinder to be achieved with a reduced settling time to compensate a slippage from a track to be followed up.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A tracking servo system for a magnetic disc drive for driving a plurality of magnetic disc media of which a respective one has on a tracking side thereof a plurality of split data field type concentric tracks of which a respective one has a plurality of servo fields of which a respective one has written therein servo information and of which a particular one has an index data as the servo information thereof at a radial direction of the plurality of magnetic disc media, the magnetic disc drive including:
   a rotary actuator; and
   a plurality of magnetic heads integrally rotatable therewith so that an arbitrary magnetic head is alternatively selected to effect one of a data writing and a data reproduction to and from the respective track on the tracking side of a corresponding one of the plurality of magnetic disc media,
the tracking servo system including:
   a positioning control means composed of a phase compensating filter for securing a stable positioning of the arbitrary magnetic head, and a frequency-shaped filter having therein a sine wave generating model for compressing a positional error of a rotation harmonic component; and
   a head velocity estimator means for estimating a velocity of the arbitrary magnetic head,
wherein the tracking servo system further comprises:
   a state variable estimator means operative, in a change-over of the arbitrary magnetic head for effecting said one of the data writing and the data reproduction at different tracking sides of the plurality of magnetic disc media, to determine a predicted value of a state variable of the frequency-shaped filter in a follow-up to the respective track after the change-over of the arbitrary magnetic head based on a current head position of the arbitrary magnetic head determined from the index data read from the particular servo field before the change-over, by using a set of calculated coefficients representative of an amplitude and a phase difference relative to the current head position of a sine wave to be calculated by a discrete Fourrier series, as the sine wave represents the state variable of the frequency-shaped filter when the respective track is followed up by the arbitrary magnetic head; and
   a state variable re-setter means for re-setting the state variable of the frequency-shaped filter and a state variable of the phase compensating filter to minimize a square error integration of the predicted value of the state variable of the frequency-shaped filter and the state variable of the phase compensating filter, as the change-over of the arbitrary magnetic head is a step response of a closed loop control system, so that a settling time of the arbitrary magnetic head due to the change-over thereof is reduced.

2. A tracking servo system for a magnetic disc drive for driving a plurality of magnetic disc media of which a respective one has on a tracking side thereof a plurality of split data field type concentric tracks of which a respective one has a plurality of servo fields of which a respective one has written therein servo information and of which a particular one has an index data as the servo information thereof at a radial direction of the plurality of magnetic disc media, the magnetic disc drive including:
   a rotary actuator; and
   a plurality of magnetic heads integrally rotatable therewith so that an arbitrary magnetic head is alternatively selected to effect one of a data writing and a data reproduction to and from the respective track on the tracking side of a corresponding one of the plurality of magnetic disc media,
the tracking servo system including:
   a positioning control means composed of a phase compensating filter for securing a stable positioning of the arbitrary magnetic head, and a frequency-shaped filter having therein a sine wave generating model for compressing a positional error of a rotation harmonic component; and
   a head velocity estimator means for estimating a velocity of the arbitrary magnetic head,
wherein the tracking servo system further comprises:
   a state variable estimator means operative, in a change-over of the arbitrary magnetic head for effecting said one of the data writing and the data reproduction at different tracking sides of the plurality of magnetic disc media, to determine a predicted value of a state variable of the frequency-shaped filter in a follow-up to the respective track after the change-over of the arbitrary magnetic head based on a current head position of the arbitrary magnetic head determined from the index data read from the particular servo field before the change-over, by using a combination of a calculated amplitude and a calculated phase difference of the state variable of the frequency-shaped filter between a pair of said tracking sides of the plurality of magnetic disc media; and
   a state variable re-setter means for re-setting the state variable of the frequency-shaped filter and a state variable of the phase compensating filter to minimize a square error integration of the predicted value of the state variable of the frequency-shaped filter and the state variable of the phase compensating filter, as the change-over of the arbitrary magnetic head is a step response of a closed loop control system, so that a settling time of the arbitrary magnetic head due to the change-over thereof is reduced.

3. A tracking servo system for a magnetic disc drive for driving a plurality of magnetic disc media of which a respective one has on a tracking side thereof a plurality of split data field type concentric tracks of which a respective one has a plurality of servo fields of which a respective one has written therein servo information and of which a particular one has an index data as the servo information thereof at a radial direction of the plurality of magnetic disc media, the magnetic disc drive including:
   a rotary actuator; and
   a plurality of magnetic heads integrally rotatable therewith so that an arbitrary magnetic head is alternatively selected to effect one of a data writing and a data reproduction to and from the respective track on the tracking side of a corresponding one of the plurality of magnetic disc media,
the tracking servo system including:
   a positioning control means composed of a phase compensating filter for securing a stable positioning of the arbitrary magnetic head, and a frequency-shaped filter having therein a sine wave generating model for compressing a positional error of a rotation harmonic component; and
   a head velocity estimator means for estimating a velocity of the arbitrary magnetic head, wherein the tracking servo system further comprises:
a state variable estimator means operative, in a change-over of the arbitrary magnetic head for effecting said one of the data writing and the data reproduction at different tracking sides of the plurality of magnetic disc media, to determine a predicted value of a state variable of the frequency-shaped filter in a follow-up to the respective track after the change-over of the arbitrary magnetic head based on a current head position of the arbitrary magnetic head determined from the index data read from the particular servo field before the change-over, by using a set of calculated coefficients representative of an amplitude and a phase difference relative to the current head position of a sine wave to be calculated by a discrete Fourrier series, as the sine wave represents the state variable of the frequency-shaped filter when the respective track is followed up by the arbitrary magnetic head; and
a mode selector means responsive to the change-over of the arbitrary magnetic head for disconnecting a first input to the frequency-shaped filter and adding a feed-forward output of the frequency-shaped filter and a feedback of a second input to the frequency-shaped filter in a follow control mode to input a resultant signal to the positioning control means, and to a lapse of a predetermined sampling time after the change-over of the arbitrary magnetic head for connecting the first input to the frequency-shaped filter and disconnecting the feedback of the second input to the frequency-shaped filter to enter the follow control mode so that a settling time of the arbitrary magnetic head due to the change-over thereof is reduced.

4. A tracking servo system for a magnetic disc drive for driving a plurality of magnetic disc media of which a respective one has on a tracking side thereof a plurality of split data field type concentric tracks of which a respective one has a plurality of servo fields of which a respective one has written therein servo information and of which a particular one has an index data as the servo information thereof at a radial direction of the plurality of magnetic disc media,
the magnetic disc drive including:
a rotary actuator; and
a plurality of magnetic heads integrally rotatable therewith so that an arbitrary magnetic head is alternatively selected to effect one of a data writing and a data reproduction to and from the respective track on the tracking side of a corresponding one of the plurality of magnetic disc media,
the tracking servo system including:
a positioning control means composed of a phase compensating filter for securing a stable positioning of the arbitrary magnetic head, and a frequency-shaped filter having therein a sine wave generating model for compressing a positional error of a rotation harmonic component; and
a head velocity estimator means for estimating a velocity of the arbitrary magnetic head,
wherein the tracking servo system further comprises:
a state variable estimator means operative, in a change-over of the arbitrary magnetic head for effecting said one of the data writing and the data reproduction at different tracking sides of the plurality of magnetic disc media, to determine a predicted value of a state variable of the frequency-shaped filter in a follow-up to the respective track after the change-over of the arbitrary magnetic head based on a current head position of the arbitrary magnetic head determined from the index data read from the particular servo field before the change-over, by using a combination of a calculated amplitude and a calculated phase difference of the state variable of the frequency-shaped filter between a pair of said tracking sides of the plurality of magnetic disc media; and
a mode selector means responsive to the change-over of the arbitrary magnetic head for disconnecting a first input to the frequency-shaped filter and adding a feed-forward output of the frequency-shaped filter and a feedback of a second input to the frequency-shaped filter in a follow control mode to input a resultant signal to the positioning control means, and to a lapse of a predetermined sampling time after the change-over of the arbitrary magnetic head for connecting the first input to the frequency-shaped filter and disconnecting the feedback of the second input to the frequency-shaped filter to enter the follow control mode so that a settling time of the arbitrary magnetic head due to the change-over thereof is reduced.

* * * * *